United States Patent Office 3,161,462
Patented Dec. 15, 1964

3,161,462
ELEMENT 96 AND COMPOSITIONS THEREOF
Glen T. Seaborg, Berkeley, Calif., assignor to the United States of America as represented by the United States Atomic Energy Commission
No Drawing. Filed Feb. 7, 1949, Ser. No. 75,064
17 Claims. (Cl. 23—14.5)

This invention relates to a new transuranic element, more specifically, it relates to the transuranic element having atomic number 96, to isotopes thereof, to compositions containing the same, and to methods of producing and purifying said elements and compositions thereof.

The expression "element 96," when used throughout this specification and claims, designates the element having atomic number 96, also known as curium, having the symbol Cm. The expression "element 95," when used throughout this specification and claims, designates the element having atomic number 95, also known as americium, having the symbol Am. Reference herein to an element is to be understood as denoting the element generically in its free state or in the form of a compound unless otherwise indicated by the context.

The term "actinide group of the heavy metals," as used in this specification and claims, refers to the transition elements having atomic numbers 90 to 96, inclusive.

It is an object of this invention to provide a novel element, curium, isotopes and compositions thereof.

An additional object of this invention is to provide methods of producing curium, isotopes and compositions thereof.

A further object of this invention is to provide methods of separating curium and compositions thereof, from other elements and compositions.

Additional objects of the presesnt invention will be evident from the following description.

In accordance with the present invention, two isotopes of curium have been synthesized in identifiable quantities, i.e., $_{96}Cm^{240}$ and $_{96}Cm^{242}$. The former isotope is an emitter of alpha particles having a range in air of 4.95 ±0.1 cm. (energy 6.3 mev.) and decays with a half-life of 26.8±0.3 days. The latter is also an emitter of alpha particles which have a range in air of 4.75±0.1 cm. (energy 6.1 mev.) and decays with a half-life of 5.0 ±0.1 months.

It has been found that these isotopes of element 96 may be synthesized by the bombardment of certain heavy metal isotopes of the actinide rare earth group with nuclear particles. For the purpose of this discussion the synthesis may be divided into two general methods: (a) the bombardment of isotopes of the actinide group of heavy metals with charged nuclear particles, and (b) the bombardment of isotopes of the actinide group of heavy metals with uncharged nuclear particles. The example of the first type preparation method is the bombardment of $Pu^{239}$ with helium ions in the cyclotron, which results in the formation of element 96 through the following reaction: $Pu^{239}(\alpha,n)Cm^{242}$. An example of the second type of preparation method is the bombardment of $Am^{241}$ with neutrons in a neutronic reactor of the pile type which results in the formation of element 96 through the following series of reactions:

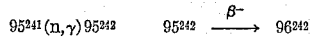

The charged particle bombardment of heavy metal isotopes to produce curium is usually carried out in a charged particle accelerator of the cyclotron type, although other accelerators, for example, linear accelerators and synchrotrons, may be used. The reaction conditions under which the first curium to be identified was produced comprised the bombardment of $Pu^{239}$ with alpha particles in a cyclotron. Both the 240 and 242 curium isotopes may be produced in this manner as shown by the following reactions: $Pu^{239}(\alpha,n)Cm^{242}$ and $Pu^{239}(\alpha,3n)Cm^{240}$. The energies of the accelerated particles required to accomplish this reaction will vary with the conditions under which the reaction is carried out. These factors are well known, however, and the optimum energy for the reaction desired may be easily calculated. In general, for the alpha bombardment of $Pu^{239}$, alpha energies of between 30 and 40 mev. have been found desirable. The plutonium targets for cyclotron bombardment may be prepared by the evaporation of a suitable plutonium solution, for example plutonium nitrate, on grooved platinum plates followed by mild ignition to form plutonium oxide. Following bombardment the curium may then be separated from the plutonium by the chemical methods which will be subsequently set forth in this application. Other heavy metal isotopes than $Pu^{239}$ may also be used as the target material, for example other isotopes of plutonium and isotopes of neptunium and americium may be used. Similarly, the charged particle used in the accelerator is not limited to the alpha particle, but ions of protium, deuterium, tritium, and $He^3$ may also be used. The preparation of curium by the charged-particle bombardment method may be further illustrated by the following example.

EXAMPLE I

The $Pu^{239}$ target was prepared as described above with 100 mg. of plutonium (as the oxide) deposited upon the platinum target plate. The plutonium target was then exposed to a bombardment of helium ions of energy 40 mev. in a 60-inch cyclotron for 63.1 microampere hours. Following the bombardment the plutonium oxide was dissolved by treatment with sulfuric acid, and the sulfuric acid solution then evaporated to dryness. This was followed by dissolution of plutonium sulfate in dilute nitric acid and the remaining undissolved oxide was dissolved by heating with nitric acid together with a small amount of added hydrofluoric acid. The plutonium in solution was then oxidized to the hexavalent state. Lanthanum fluoride was then precipitated from the solution, carrying with it the insoluble curium trifluoride and leaving in solution the soluble hexavalent plutonium fluoride. The alpha activity of the precipitate was found to be about $2 \times 10^5$ alpha particle disintegrations/min. This alpha activity was analyzed with the alpha pulse multi-channel analyzer and it was found that 20% of this activity was $96^{242}$ activity with a range of 4.75 cm., the remaining 80% being due to another alpha emitter, which emitted alpha particles with a range of 4.95±0.1 cm. in air at 15° C. and 760 mm. of mercury pressure. The over-all initial decay sample gave a half-life of about one month indicating that the half-life of the 4.95 cm. range activity was somwhat less than one month and later resolution gave the value of 26.8 days. This activity was definitely identified to be $96^{240}$ by the following method. The sample of this activity was set aside and allowed to decay from the second to the fourth day after shut-down of the cyclotron. The plutonium fraction was then isolated and a pulse analysis curve, as well as an alpha decay curve of this plutonium sample gave definite evidence of $Pu^{236}$. The element 96 fraction was then allowed to grow plutonium again (77 days of growth) and the amount of $Pu^{236}$ which was grown was quantitatively determined by the addition of $Pu^{239}$ tracer to establish the chemical loss in the process of separation of the plutonium from the element 96. The additional details of this experiment which allowed a calculation of a half-life of the element 96 parent were as follows: A sample of a $96^{242}$–$96^{240}$ mixture that contains $1.38 \times 10^5$ alpha counts/min. and in which initially 70.2% of the counts were due to $96^{240}$ was allowed to decay for 77 days. At the end of that time the plutonium fraction was isolated after addition of 1935 counts/min. of $Pu^{239}$ and the resulting plutonium sample pulse analyzed. The average of such pulse analyses gave 1.14 as the value of the ratio of $Pu^{236}$ to $Pu^{239}$. The half-life of $96^{240}$ was then calculated by using the value 983 days for the half-life of $Pu^{236}$ to give a value of 26.9 days. This is in excellent agreement with the value 26.8 days for the half-life of $96^{240}$ obtained by resolution of alpha decay curves.

In general, it has been found that element 96 is most conveniently synthesized by the neutron-irradiation of heavy metal isotopes. Heavy metal isotopes, which may be neutron-irradiated to produce curium, include $Am^{241}$, $Pu^{239}$ and $U^{238}$. A diagram showing how certain heavy metal isotopes may be converted to $96^{242}$ through neutron-irradiation and suitable aging to permit $\beta^-$ decay is shown herewith as FIGURE I.

*FIGURE I*

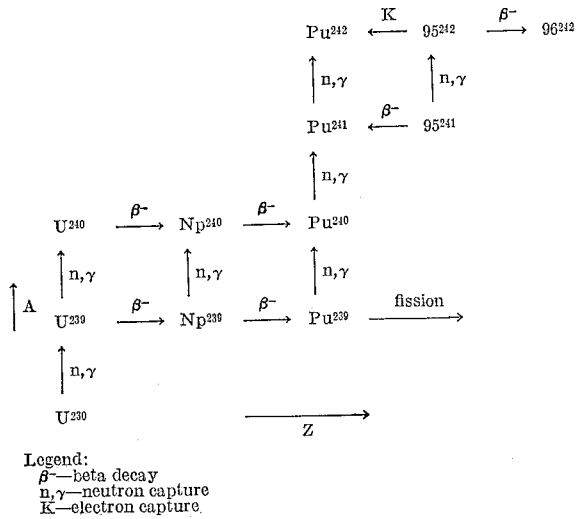

Legend:
$\beta^-$—beta decay
$n,\gamma$—neutron capture
$K$—electron capture

It is apparent from this diagram that curium may be synthesized by the neutron-irradiation and $\beta^-$ decay of isotopes of uranium, neptunium, plutonium, and americium. The general method of preparing curium by the neutron-irradiation of heavy metal isotopes may be conveniently illustrated by describing the preparation of curium in a natural uranium pile neutronic reactor by neutron-irradiation of $Pu^{239}$. Such a reactor is described and claimed in copending application for U.S. Letters Patent, Serial No. 568,904 of Enrico Fermi and Leo Szilard, filed December 19, 1944, now matured into U.S. Patent 2,708,656. In such reactors a fissionable isotope, such as $U^{235}$ in natural uranium, undergoes fission and releases fast neutrons in excess of the neutrons absorbed in the fission process. The fast neutrons are slowed down to approximately thermal energies by impact with a moderator such as graphite or deuterium oxide, and the resulting slow neutrons (energies of 0 to 0.3 electron volt) are then absorbed by $U^{235}$ to produce further fission and by $U^{238}$ to produce $U^{239}$ which decays through $93^{239}$ to $94^{239}$. The rate of production of plutonium in such reactors may be equated, approximately, to the power output of the reactor.

A portion of the $94^{239}$ thus produced in the reactor under such conditions, absorbs neutrons to form the isotope, $94^{240}$. Alternately $94^{239}$ from any source exposed in such a neutronic reactor would behave similarly. If the $Pu^{240}$ isotope is maintained in a neutronic reactor for a substantial period after its formation, it is transformed into the next heavier isotope, $94^{241}$. As previously pointed out, $94^{241}$ is a beta emitter and decays into $95^{241}$. $95^{241}$ in turn captures neutrons to form $95^{242}$ which decays by $\beta^-$ emission to form $96^{242}$.

The mechanism of formation of $94^{241}$ as indicated by the nuclear reactions shown in FIGURE I is such that its concentration in pile uranium is proportional to the third power of the specific neutron exposure and the ratio of its concentration to that of $94^{239}$ is proportional to the second power of the specific neutron exposure. Hence, the amount of $94^{241}$ which is formed per day per unit of plutonium in the free or combined state is proportional to the second power of the specific neutron exposure of the uranium from which the plutonium was formed. Inasmuch as the decay of $95^{242}$ to $96^{242}$ occurs during, as well as after, the neutron-bombardment period, the percentage of the latter in the transuranic fraction can be controlled by varying the time of bombardment, the time of aging subsequent to bombardment of uranium, or both.

From an inspection of the above-proposed nuclear reactions, it will be apparent that the formation of element 96 is dependent upon the concentration of $95^{242}$, which is in turn dependent upon the amount of $94^{239}$ produced. Also, while the desired concentration of element 96 in the transuranic fraction of the product may be obtained by sufficient bombardment alone, it will be evident that a finite aging time will ensue before the separation of element 96 from the bombarded product can be effected. In the present description, therefore, it can be assumed that the bombarded product is always aged and that the concentration of element 96 in the transuranic fraction of the product is controlled by the total bombardment time plus aging.

The isotope to be irradiated in a neutronic reactor may be placed in the pile as a compound, a solution of a compound, a metallic alloy, or as the metal. For example, $Pu^{239}$ has been prepared for irradiation in a chain-reacting pile by precipitation of the plutonium as the hydroxide followed by drying in vacuo and the insertion of the dried plutonium hydroxide in a closed platinum tube for insertion into the pile. In other instances, the plutonium in the form of plutonium metal foil was placed between two half-cylinders of aluminum and the cylinder thus formed jacketed with an aluminum can of the same diameter as those used for the regular uranium slugs. A plutonium-containing slug prepared in this way may be suitably inserted in the regular channels for introducing the uranium slugs into the pile. The position of the isotope to be irradiated in the pile is not critical, although it is, of course, desirable from a production standpoint to have the isotope inserted in the pile in a position of maximum neutron flux.

From an examination of the neutronic reactions disclosed in FIGURE I, it will be readily apparent that the most desirable isotope to irradiate for the maximum production of curium is $Am^{241}$. For a given value of irradiation and aging time, irradiation of this isotope will give the maximum amount of curium. $Pu^{240}$, although not as satisfactory as $Am^{241}$, will also give a large yield of curium for a given amount of neutron-irradiation and aging time. However, the isotope most widely used at the present time for the production of curium is $Pu^{239}$ because of its availability. The total intensity of the $Cm^{242}$ particles produced by neutron-irradiation of $Pu^{239}$ varies approximately, but never exactly, as the third power of the total neutron-irradiation (i.e., neutron flux $x$ time of the irradiation).

Now that the production of curium by the neutron-irradiation of $Pu^{239}$ has been generally described, this process may be further illustrated by the following example.

EXAMPLE II

One hundred fifty mg. of plutonium metal foil was placed between two half-cylinders of aluminum and jacketed with an aluminum can of the same diameter as those used for the regular uranium slugs used in a neutronic reactor. This plutonium-containing slug was inserted in the regular uranium slug channel in a natural uranium pile with graphite spacers between the plutonium-containing slug and uranium slugs. The plutonium-containing slug was permitted to remain in the pile until a quantity of $96^{242}$ sufficient to produce $2 \times 10^6$ disintegrations/min. had been synthesized by the combined neutron-irradiation and beta decay. The plutonium-containing slug was then removed from the pile and allowed to decay for about one month. The plutonium metal had been converted to the oxide by the process of irradiation and this plutonium oxide containing $96^{242}$ oxide was dissolved by the use of sulfuric acid and the solution then heated until extensive fumes of sulfur trioxide appeared. The heating was then continued to dryness. This was followed by the dissolution of the plutonium sulfate in dilute nitric acid and the remaining undissolved oxide was dissolved by heating with nitric acid, together with a small amount of added hydrofluoric acid. The plutonium contained in the solution was then oxidized to the hexavalent state with 0.1 N $K_2Cr_2O_7$. A lanthanum fluoride precipitate was then formed in the solution and separated therefrom, carrying with it the curium as the curium trifluoride. The precipitate was dissolved and the operation repeated until all of the plutonium was eliminated. The amount of $Cm^{242}$ was then determined by analysis in a multi-channel pulse analyzer.

$Cm^{240}$ and $Cm^{242}$ have been synthesized by the process of this invention and separated from other elements. In addition to these two isotopes of curium, it is believed that a third isotope, $96^{241}$, has also been produced. When the combined americium-curium fraction of a plutonium target, bombarded with helium ions, is separated from the plutonium and the activity thereof followed with various absorbers by a Geiger counter, typical decay curves are attained. From calculations of these decay curves, it is apparent that four isotopes are present. In addition to the activites due to $96^{240}$ and $96^{242}$, there is an activity of 55-day half-life and an activity of 2-day half-life. The 2-day activity has been tentatively identified as belonging to $Am^{238}$. The 55-day activity has a large amount of soft-electromagnetic radiation, perhaps some electrons, but no hard gamma rays. It is believed that this activity is due to orbital electron capture in $96^{241}$.

It has been observed that nuclear energy is obtainable from curium, i.e., isotopes of element 96 have been found to be fissionable with thermal neutrons. Curium may also be fissioned by other sub-atomic particles having sufficient energy such as, for example, deuterons.

Curium is believed to be the seventh member of an actinide series of rare earths, corresponding to the lanthanide series of rare earths. This series is believed to be built up by the addition of electrons to the 5f orbit in the same way that the lanthanide series of rare earths is built up by the addition of electrons to the 4f orbit. By analogy with the lanthanum rare earth, it was therefore believed that the chemical behavior of curium would be similar to that of the seventh member of the rare earth series, gadolinium, and that curium would exhibit a very stable +3 valence state. Numerous experiments have proved that this hypothesis, as to the chemical action of curium, is correct. Separation of curium from aqueous solutions and from most of the elements depends upon the great stability in aqueous solutions of curium in the trivalent state. Thus, curium may be separated from all elements, except indium, lanthanum, the rare earths, yttrium, actinium, thorium, protactinium, and americium by either the reduction of these elements with zinc amalgam or the oxidation of these elements with argentic ion, followed by the precipitation of curium trifluoride. Curium trifluoride may either be precipitated directly if the curium is present in solution in sufficient concentration or the curium fluoride may be carried from solution with a carrier, such as lanthanum or cerous fluoride. If a carrier is to be used to separate the curium fluoride, ions such as trivalent aluminum and ferrous ion which form complex fluorides should be removed from the solution prior to the precipitation of the carrier fluoride.

Curium may be separated from indium by forming a hydrochloric acid solution containing curium and indium, precipitating the mixed curium and indium fluorides, converting the fluorides to the hydroxides and dissolving these in 6 M acetic acid and saturating the solution with $H_2S$. Indium sulfate is thus precipitated and may be separated from the solution, leaving the curium in solution.

Curium may be separated from actinium, protactinium, thorium, and cerium by forming a ceric or zirconium iodate carrier precipitate in an aqueous solution containing curium and a contaminant of this class. Curium is not co-precipitated with the carrier precipitate to as great an extent as are these contaminants.

Curium may be separated from a member of the yttrium sub-group of the rare earths by forming a solution having a pH of not less than 7 and precipitating therefrom a carbonate, oxalate, or formate of lanthanum or praseodymium. This carrier will remove the rare earth of the yttrium sub-group, leaving the curium in solution. It may be desirable to form the carrier precipitate in the solution containing a gadolinium or lutecium holdback carrier.

Europium may be separated from curium by forming an aqueous solution containing europium and curium in the ionized state, for example an aqueous trichloride solution of these elements, then reducing the europium ions to the divalent state with a suitable reducing agent, such as zinc amalgam, and precipitating europium sulfate, leaving the curium in solution.

The fluosilicate ion has been found to be an effective complexing agent for curium and curium may be separated from the cerium sub-group of rare earths by complexing the curium ion with fluosilicate ion during the partial precipitation of the cerium sub-group rare earth with a rare earth fluoride as carrier.

Curium may be separated from americium by selective elution from a cation exchange resin.

The hydroxide of curium was prepared by treating curium trifluoride with concentrated ammonium hydroxide, then separating the curium hydroxide thus formed, and dissolving it in nitric acid and finally reprecipitating the curium hydroxide with ammonium hydroxide. The curium hydroxide was then separated from the solution. The color of the curium hydroxide is white, with a yellowish tinge. The oxide of curium was prepared by igniting a dried sample of curium nitrate in air. The dissolution of the target in sulfuric acid, followed by nitric acid treatment, produced the sulfate and the nitrate of curium. According to this invention, this element forms halides, the specific example being curium trifluoride which is insoluble in dilute nitric or sulfuric acid.

The present application is a continuation-in-part of co-pending application, Serial No. 692,730, filed August 23, 1946, in the U.S. Patent Office by Glenn T. Seaborg, and the disclosure contained in said co-pending application is incorporated herein by reference.

It will be apparent to those skilled in the art to which this invention pertains that various modifications may be made without departing from the principles of the invention as disclosed herein, and thus it is not intended that the invention should be limited other than by the scope of the appended claims.

What is claimed is:
1. Element 96.
2. The isotope of element 96 having the mass number 242.
3. The isotope of element 96 having the mass number 240.
4. A salt of element 96 and a mineral acid.
5. The trihalide of element 96.
6. The trifluoride of element 96.
7. The hydroxide of element 96.

8. The oxide of element 96.

9. A process for the removal of element 96 values from a solution containing said values, which comprises contacting said solution with a lanthanide rare earth fluoride precipitate carrier for said element and separating said carrier precipitate and associated element 96 values from the solution.

10. The process of claim 9 wherein the carrier is lanthanum fluoride.

11. The process of claim 9 wherein the carrier is cerous fluoride.

12. The process of separating curium from plutonium, which comprises precipitating curium trifluoride from an aqueous acidic solution containing ions of curium and ions of plutonium in the hexavalent state.

13. The process of separating curium from plutonium, which comprises forming an aqueous acidic solution containing ions of curium and hexavalent ions of plutonium and precipitaing from said solution a carrier precipitate of a rare earth fluoride containing curium.

14. The process of claim 13 wherein the carrier precipitate is lanthanum fluoride.

15. A process of producing curium 242 by bombarding $Pu^{240}$ with neutrons until a substantial amount of the $Pu^{240}$ is converted to $Pu^{241}$, aging the $Pu^{241}$ whereby $Am^{241}$ is produced by beta decay, bombarding the $Am^{241}$ with neutrons until a substantial amount of the $Am^{241}$ is converted to $Am^{242}$, aging the $Am^{242}$ whereby $Cm^{242}$ is produced by beta decay, and recovering the $Cm^{242}$.

16. The process of producing $Cm^{242}$ which comprises bombarding $Pu^{239}$ with neutrons until a substantial amount of $Pu^{239}$ is converted to $Pu^{241}$, permitting the $Pu^{241}$ to decay to $Am^{241}$, bombarding the $Am^{241}$ with neutrons until a substantial amount of the $Am^{241}$ is converted to $Am^{242}$, permitting the $Am^{242}$ to decay to $Cm^{242}$, and recovering the $Cm^{242}$ by dissolving the mass in an aqueous mineral acid, contacting the resulting solution with a fluoride compound soluble in said solution whereby a curium precipitate is formed and separating said precipitate from the solution.

17. A process of producing $Cm^{242}$ which comprises bombarding $Am^{241}$ with neutrons until a substantial amount of said $Am^{241}$ is converted to $Am^{242}$, aging the $Am^{242}$ whereby $Cm^{242}$ is produced by beta decay and recovering the curium by dissolving the irradiated mass in an aqueous mineral acid and contacting the resultant solution with a lanthanide rare earth fluoride carrier and separating said carrier from the solution.

References Cited by the Examiner
UNITED STATES PATENTS

| | | | |
|---|---|---|---|
| 2,206,634 | 7/40 | Fermi et al. | 176—11 |
| 2,425,573 | 8/47 | Soddy | 23—14.5 |
| 2,448,479 | 8/48 | Wilhelm et al. | 23—14.5 |
| 2,708,656 | 5/55 | Fermi et al. | 176—41 |

FOREIGN PATENTS 233,011  10/44  Switzerland.

OTHER REFERENCES

Grosse: Journal of American Chemistry Soc., vol 57 (1935), pp. 440–441.

Chemical Abstracts, 30, 8007 (1936), Abstract of Hahn et al., Ber. 69B, 905–6 (1936).

McMillan et al.: Physical Review, vol. 57 (1940), pp. 1185 and 1186.

Smyth Report: "A General Account of the Development of Methods of Using Atomic Energy for Military Purposes Under the Auspices of the U.S. Government." U.S. Government Printing Office, August 1945 (release date Aug. 11–12), pp. 26, 41 and 94–99.

Seaborg: Chem. Eng. News 23, 2190–3, Dec. 10, 1945; presented at Symposium at Northwestern University on Nov. 16, 1945.

Seaborg: Plutonium and Other Transuranium Elements, AEC, declassified paper 17 DDC 505, Nov. 19, 1946, pp. 1–9.

Seaborg et al.: "The Transuranium Elements," MDDC–1609, U.S. AEC 4 pages, date of manuscript Dec. 3, 1946.

Seaborg: Chem. Eng. News 25, 358–60, 397 (1947).

CARL D. QUARFORTH, *Primary Examiner.*

JAMES L. BREWRINK, JOHN R. SPECK, WILLIAM G. WILES, ROGER L. CAMPBELL, *Examiners.*